US011037689B2

(12) United States Patent
Roillet et al.

(10) Patent No.: US 11,037,689 B2
(45) Date of Patent: Jun. 15, 2021

(54) DEVICE AND METHOD FOR UNDERWATER REPAIR OF HOLE OF A NUCLEAR REACTOR PART

(71) Applicant: FRAMATOME, Courbevoie (FR)

(72) Inventors: Serge Roillet, Lyons (FR); Julien Valero, Chaponost (FR)

(73) Assignee: FRAMATOME, Courbevoie (FR)

(*) Notice: Subject to any disclaimer, the term of this patent is extended or adjusted under 35 U.S.C. 154(b) by 271 days.

(21) Appl. No.: 16/075,420

(22) PCT Filed: Feb. 10, 2017

(86) PCT No.: PCT/EP2017/053081
§ 371 (c)(1),
(2) Date: Aug. 3, 2018

(87) PCT Pub. No.: WO2017/137608
PCT Pub. Date: Aug. 17, 2017

(65) Prior Publication Data
US 2019/0043627 A1 Feb. 7, 2019

(30) Foreign Application Priority Data
Feb. 12, 2016 (FR) .................... FR 16 51167

(51) Int. Cl.
*G21C 3/334* (2006.01)
*B23D 75/00* (2006.01)
(Continued)

(52) U.S. Cl.
CPC ............ *G21C 3/334* (2013.01); *B23D 75/00* (2013.01); *B23D 77/14* (2013.01);
(Continued)

(58) Field of Classification Search
CPC ..... B23D 75/00; B23D 77/14; B23D 2277/28; G21C 3/334
See application file for complete search history.

(56) References Cited

U.S. PATENT DOCUMENTS 2,983,989 A   5/1961   Frantz et al.
3,351,143 A * 11/1967  Seibold ............. B23Q 11/0046
                                                  175/209
(Continued)

FOREIGN PATENT DOCUMENTS

FR   2894375 A1 *  6/2007  ............ G21C 17/00
FR   2975316 A1 * 11/2012  ........... B23B 31/005
JP   H0366509 A    3/1991

OTHER PUBLICATIONS

Search Report for Corresponding FR 1651167, dated Oct. 26, 2016.

*Primary Examiner* — Eric A. Gates

(57) ABSTRACT

A repair device for underwater repair of a hole in a nuclear reactor part includes a holder (32), a cutting tool (22) held by the holder (32) and having at least one cutting tooth (70) for remachining an inner surface of the hole. The cutting tool (22) has a suction channel (44) extending into the cutting tool (22) between at least one inlet opening (46) and at least one outlet opening (48), a drive shaft (34) for rotating the cutting tool (22), the drive shaft (34) being held by the holder (32), and a suction tube (36) connected to the holder (32) and fluidly connected to the outlet opening (48) of the suction channel (44).

16 Claims, 4 Drawing Sheets

(51) Int. Cl.
*B23D 77/14* (2006.01)
*G21C 3/33* (2006.01)
*G21C 5/06* (2006.01)
*G21C 19/02* (2006.01)

(52) U.S. Cl.
CPC ........ *B23D 2277/28* (2013.01); *G21C 3/3315* (2013.01); *G21C 5/06* (2013.01); *G21C 19/02* (2013.01); *Y10T 408/50* (2015.01)

(56) References Cited

U.S. PATENT DOCUMENTS

| | | | |
|---|---|---|---|
| 4,538,944 A * | 9/1985 | Hougen | B23B 51/0406 |
| | | | 408/206 |
| 4,690,593 A * | 9/1987 | Nee | G21C 5/02 |
| | | | 408/80 |
| 4,991,280 A * | 2/1991 | Reimer | B23H 9/00 |
| | | | 29/402.06 |
| 5,125,772 A * | 6/1992 | Kress | B23D 77/02 |
| | | | 408/57 |
| 5,802,126 A * | 9/1998 | Matsumoto | G21C 5/10 |
| | | | 376/260 |
| 6,132,147 A * | 10/2000 | Kazirskis | B23Q 11/0046 |
| | | | 408/1 R |
| 8,556,550 B2 * | 10/2013 | Lutz | B23B 51/0009 |
| | | | 408/56 |
| 9,434,009 B2 * | 9/2016 | Kakimoto | B23Q 11/0046 |
| 9,555,480 B2 * | 1/2017 | DeLand | B23D 77/006 |
| 2012/0251256 A1 * | 10/2012 | Shea | B23D 77/02 |
| | | | 408/145 |

* cited by examiner

DEVICE AND METHOD FOR UNDERWATER REPAIR OF HOLE OF A NUCLEAR REACTOR PART The present invention relates to the field of the underwater repair of a hole of a nuclear reactor part, in particular an upper nozzle of a nuclear fuel assembly.

BACKGROUND

The nuclear reactor comprises a reactor core made up of a plurality of nuclear fuel assemblies, arranged side by side between a lower core plate and an upper core plate.

Each nuclear fuel assembly comprises a bundle of nuclear fuel rods extending between a lower nozzle, by which the nuclear fuel assembly rests on the lower core plate, and an upper nozzle, by which the nuclear fuel assembly bears against the upper core plate.

In order to position the nuclear fuel assemblies laterally, centering holes can be positioned on the upper face of the upper nozzle and/or on the lower face of the lower nozzle of each nuclear fuel assembly.

They are intended to receive centering pins positioned on the lower face of the upper core plate, respectively on the upper face of the lower core plate, of the nuclear reactors.

Each centering hole generally comprises a cylindrical hole, blind or through, and a bevel at the inlet of the centering hole.

These centering holes provide the proper positioning of the upper part, respectively of the lower part, of the nuclear fuel assemblies in the core of the reactor, in particular to see to the passage of the coolant between the nuclear fuel assemblies, and the drop of the clusters making it possible to control the reactivity of the reactor core.

These centering holes also make it possible to see to the positioning and docking of the equipment for handling the nuclear fuel assemblies and the clusters (machine for loading a nuclear fuel assembly, for example) as well as equipment for intervening on the nuclear fuel assemblies (replacing a nuclear fuel rod, for example).

SUMMARY OF THE INVENTION

During docking, it is possible for a centering hole to be damaged by matting and pushing of material inside the centering hole, forming a surplus of material inside the centering hole.

This damage may later lead to jamming of a centering pin in the centering hole. Such jamming for example taking place between a damaged centering hole and a pin of the upper core plate could cause the nuclear fuel assembly to be removed from the core with the upper core plate during the opening of the reactor vessel for an operation on the core.

When a centering hole of a nozzle is damaged, it is possible to change the nozzle to make the assembly compliant and allow it to continue to be used.

Replacing a nozzle is a relatively lengthy operation and may lead to damaging other parts of the assembly, such as the guide tubes extending between the upper nozzle and the lower nozzle and provided to receive rods of a control cluster or a fixed cluster in the nuclear fuel assemblies for pressurized water reactors (PWR) or the connections between the guide tubes and the nozzle.

Furthermore, a nozzle is a bulky and highly radioactive part requiring, when it is removed, specific storage and an appropriate removal mode outside the normal handling cycle of spent nuclear fuel assemblies.

One aim of the present disclosure is to propose a repair device allowing a simpler, more reliable and more economical repair, and having fewer risks.

To that end, a device for the underwater repair of a hole of a nuclear reactor part is provided, comprising a holder, a cutting tool held by the holder and having at least one cutting tooth for machining an inner surface of the hole, the cutting tool having a suction channel extending into the cutting tool between at least one inlet opening and at least one outlet opening, a drive shaft for rotating the cutting tool, the drive shaft being held by the holder, and a suction tube connected to the holder and fluidly connected to the outlet opening of the suction channel.

According to specific embodiments, the device includes one or more of the following features, considered alone or according to any technically possible combination(s):

the cutting tool comprises a cutting part and a drive part connected to the drive shaft, the outlet opening emerging in a recess of the drive shaft, the drive shaft having at least one lateral opening for the passage of the fluid from the inside of the recess toward the outside, the suction channel being connected to the holder in register with the lateral opening to suction the fluid through the lateral opening;

the holder and the drive shaft comprise at least one rotational guiding assembly comprising a bearing provided on the holder and a complementary transmission shaft provided on the drive shaft;

the holder and the drive shaft comprise two rotational guiding assemblies located, along the drive shaft, on either side of the or each lateral opening;

at least one rotational guiding assembly provides the sealing between the holder and the drive shaft;

the holder is a support tube, the cutting tool being arranged at one end of the holder, the drive shaft extending inside the holder between the ends of the holder;

the cutting tool extends along a longitudinal axis, the cutting tooth extending substantially rectilinearly along the longitudinal axis;

the inlet opening of the suction channel is arranged at the base of an undercut face of the cutting tooth;

the inlet opening of the suction channel is elongated along the cutting tooth;

the cutting tool is a reamer;

the cutting tooth comprises a portion for machining a circular cylindrical hole and a portion for machining a frustoconical bevel at the inlet of the circular cylindrical hole;

the cutting tool comprises, on a cutting part of the cutting tool bearing the cutting tooth, at least one flat offset on the circumference of the cutting part, relative to the cutting tooth;

the device comprises a stop surface able to abut against the part in which the hole to be repaired is arranged in order to limit the travel of the cutting tool in the hole to be repaired; and the device comprises a cutting tool in order to produce a centering hole for a nuclear fuel assembly upper nozzle, a mistake-proofing hole for a nuclear fuel assembly upper nozzle, a centering hole for a nuclear fuel assembly lower nozzle, a hole for a lower core plate or a hole for an upper core plate.

A method for underwater repair of a damaged hole of a nuclear reactor part is also provided, comprising re-machining the hole using a repair device comprising a cutting tool having a suction channel extending inside the cutting tool between at least one inlet opening and at least one outlet opening, to suction shavings generated by the cutting tool.

According to specific embodiments, the method includes one or more of the following features, considered alone or according to any technically possible combination(s):

the cutting tool is a reamer;

the hole is a centering hole for a nuclear fuel assembly upper nozzle, a centering hole for a nuclear fuel assembly lower nozzle, a mistake-proofing hole for a nuclear fuel assembly upper nozzle, a hole for a lower core plate or a hole for an upper core plate;

the outlet opening emerges inside a holder bearing the cutting tool, a suction tube being connected to the holder to suction the shavings; and the holder assumes the form of a support tube, the cutting tool being arranged at one end of the holder, the repair device comprising a drive shaft to rotate the cutting tool, the drive shaft extending inside the holder.

A cutting tool for machining the inner surface of a hole of a nuclear reactor part is also provided, the cutting tool comprising a suction channel extending inside the cutting tool between at least one inlet opening and at least one outlet opening.

BRIEF SUMMARY OF THE DRAWINGS

The invention and its advantages will be better understood upon reading the following description, provided solely as an example, and done in reference to the appended drawings, in which.

DETAILED DESCRIPTION

Figure 1:
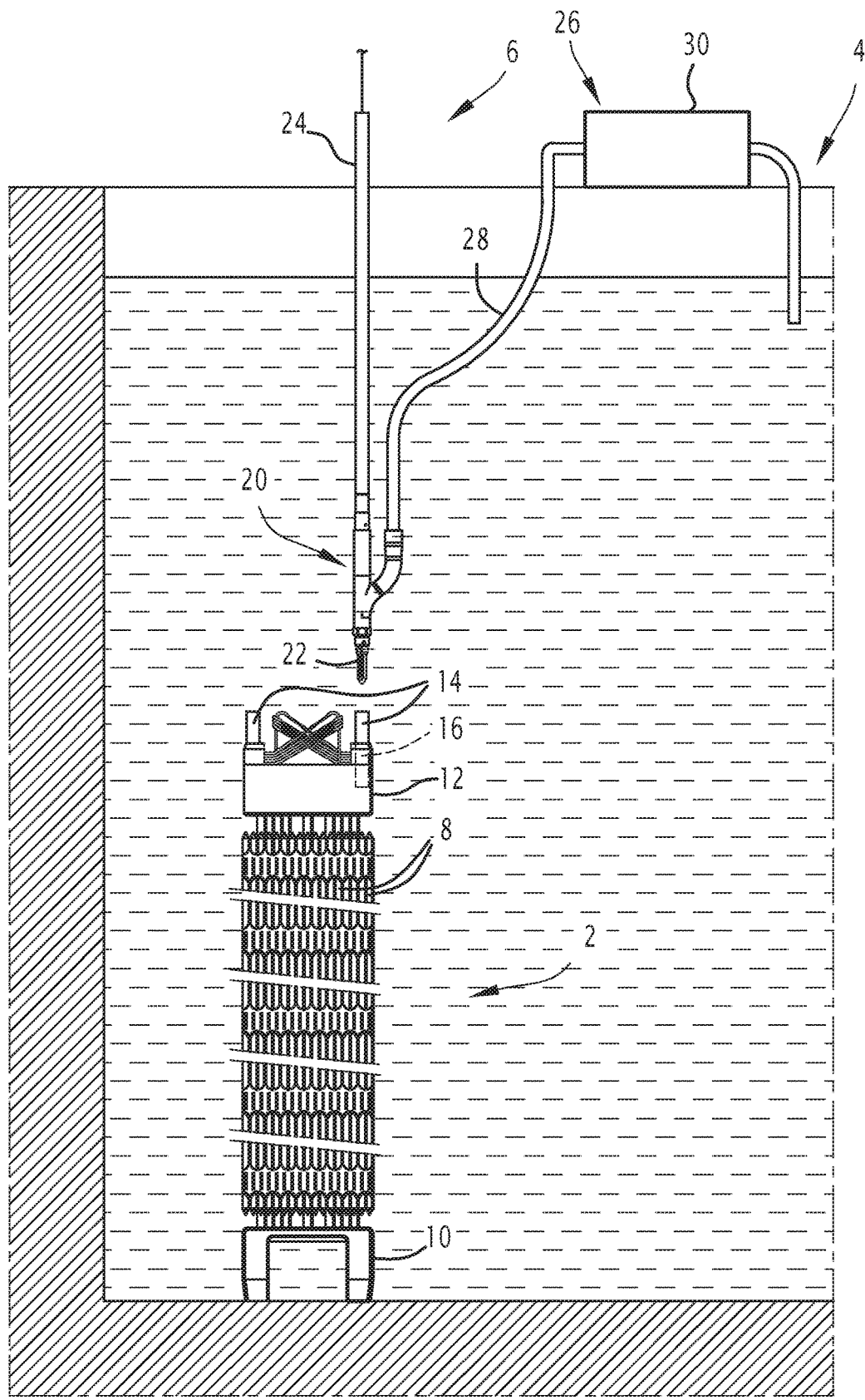
FIG. 1 is an elevation view of a pool of a nuclear power plant, in which a damaged nuclear fuel assembly is positioned, and a repair system.

In FIG. 1, a damaged nuclear fuel assembly 2 is placed underwater in a pool 4 of a nuclear power plant in order to be repaired using a repair system 6.

The nuclear fuel assembly 2 comprises a bundle of elongate nuclear fuel rods 8 extending between a lower nozzle 10, provided to rest on a lower core plate of the reactor of the nuclear power plant, and an upper nozzle 12, provided to bear against an upper core plate of the reactor of the nuclear power plant. In FIG. 1, the nuclear fuel assembly 2 is vertical, the lower nozzle 10 being located at the bottom and the upper nozzle 12 at the top.

Conventionally, the upper nozzle 12 comprises springs 14 provided to bear against the upper core plate so as to push the nuclear fuel assembly 2 downward.

Figure 2:
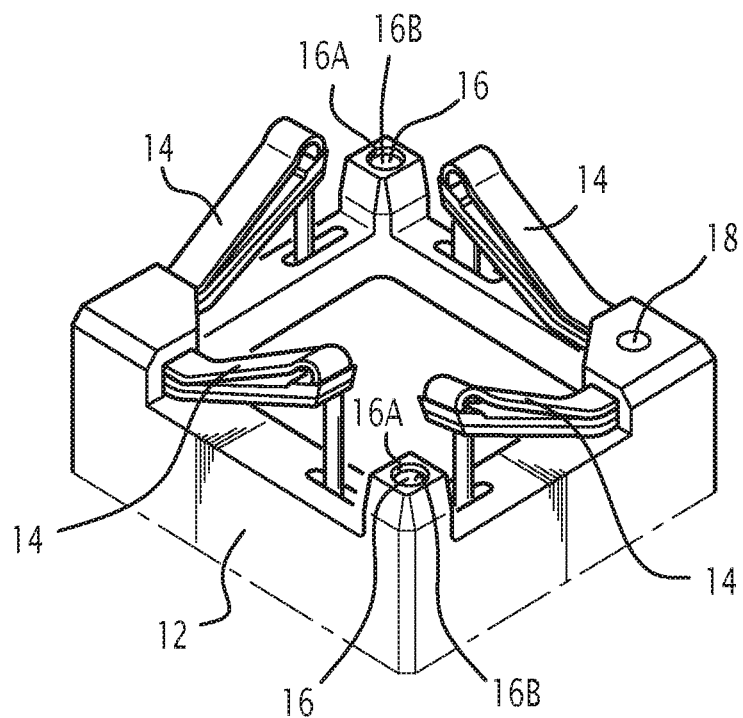
FIG. 2 is a top view of the nuclear fuel assembly.

As illustrated in FIG. 2, the upper nozzle 12 is provided with centering holes 16, each centering hole 16 being intended to receive a respective centering pin of the upper core plate in order to provide precise absolute positioning of the upper end of the nuclear fuel assembly 2.

The upper nozzle 12 here has a square contour and comprises two centering holes 16 arranged in two diagonally opposite corners of the upper nozzle 12. In another corner, the upper nozzle 12 further comprises a mistake-proofing hole 18 making it possible to guarantee that the nuclear fuel assembly 2 is oriented appropriately.

The centering holes 16 are also used for docking handling equipment of the nuclear fuel assembly 2 or operating equipment to perform operations on the nuclear fuel assembly 2, for example to replace a nuclear fuel rod 8.

The lower nozzle 10 also comprises centering holes (not shown) in two diagonally opposite corners, each of these centering holes being intended to facilitate the docking of the nuclear fuel assembly 2 on the lower core plate and to receive a respective centering pin of the lower core plate so as to guarantee precise absolute positioning of the lower end of the nuclear fuel assembly 2. These centering holes are also used for docking operating equipment to perform operations on the nuclear fuel assembly 2, for example for operations requiring turning the nuclear fuel assembly 2 over beforehand.

A centering hole 16 generally comprises an inlet bevel 16A and a circular cylindrical hole 16B, blind or through, extending from the inlet bevel 16A.

It is possible for a centering hole 16 to be damaged during the docking of equipment or a core plate. A damaged centering hole 16 may have pushed in material that forms a projection inside the centering hole 16 and that may cause later jamming of a centering pin in the damaged centering hole 16.

Returning to FIG. 1, the repair system 6 comprises a repair device 20 suitable for the underwater repair of a damaged centering hole 16 of the nuclear fuel assembly 2, by machining the centering hole 16, more specifically by re-boring the centering hole 16.

The repair device 20 comprises a cutting tool for machining the inner surface of the damaged centering hole 16, more specifically a cutting tool 22 for re-boring the centering hole 16.

The repair device 20 is able to be submerged and is maneuverable remotely, for example using a handling pole 24.

The repair system 6 further comprises a suction system 26 comprising a suction pipe 28 for suctioning the shavings resulting from the machining and a suction and filtration device 30 for suctioning the shavings and water, filtering the water to recover the shavings, and discharging the filtrate into the pool 4.

The repair device 20 is arranged at one end of a handling pole 24 and submerged underwater, the suction pipe 28 having one end connected to the repair device 20 and the other end connected to the section and filtration device 30, to suction shavings.

Figure 3:
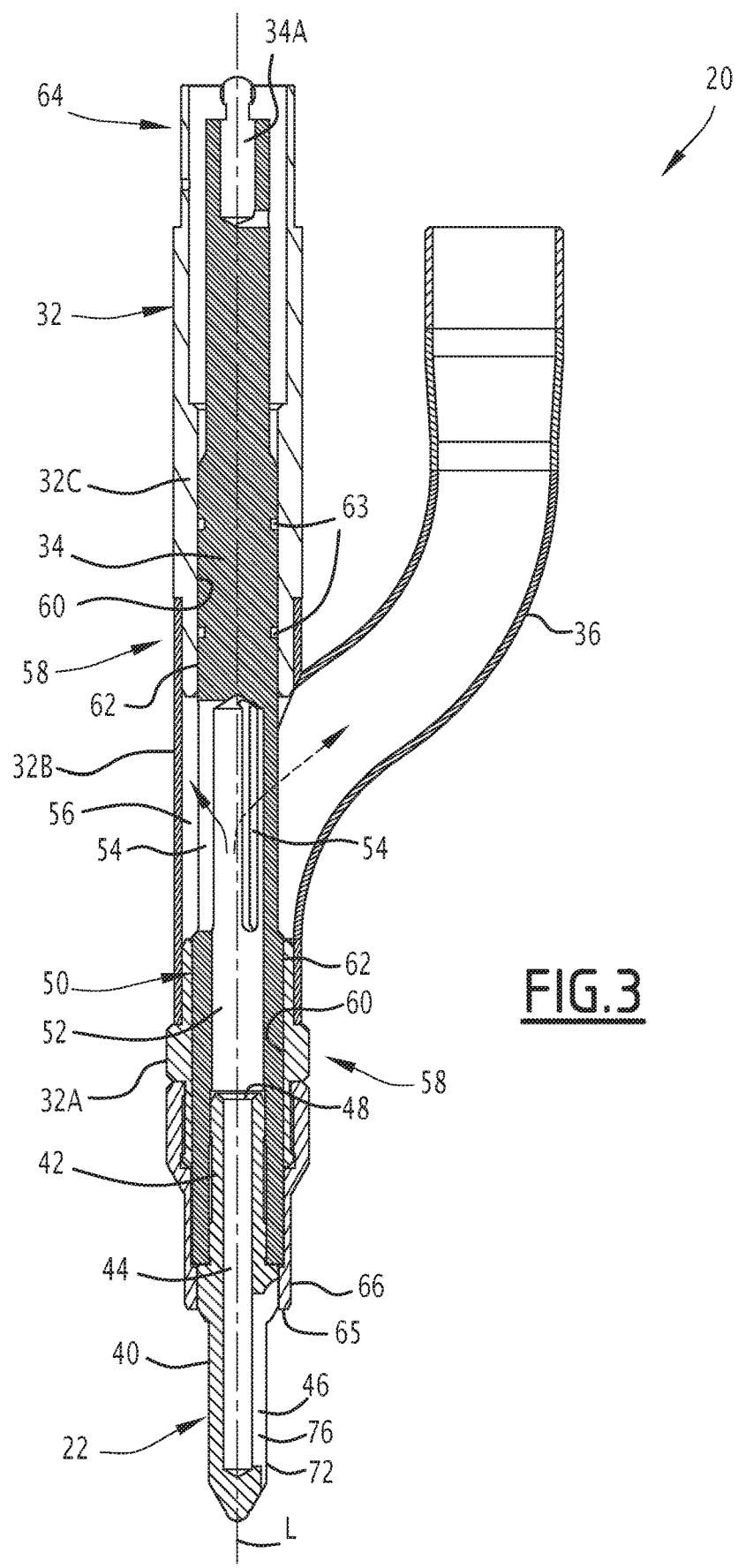
FIG. 3 is a sectional view of a repair device of the repair system.

As illustrated in FIG. 3, the repair device 20 comprises a holder 32, a cutting tool 22 connected to a drive shaft 34 held by the holder 32, the drive shaft 34 extending inside the holder 32 in order to rotate the cutting tool 22, and a suction tube 36 to suction shavings generated by the cutting tool 22.

The cutting tool 22 extends along a longitudinal axis L around which the cutting tool 22 is rotated during the machining. The cutting tool 22 successively has, along the longitudinal axis L, a cutting part 40 to cut the material due to the rotational driving of the cutting tool 22, and a driving part 42 to rotate the cutting tool 22.

The cutting tool 22 has a suction channel 44 extending inside the cutting tool 22 along the longitudinal axis L. The suction channel 44 has an inlet opening 46 arranged in the cutting part 40 and an outlet opening 48 arranged in the drive part 42.

The outlet opening 48 emerges inside the holder 32. The suction tube 36 is connected to the holder 32 so as to be in fluid communication with the outlet opening 48 of the suction channel 44.

The drive part 42 of the cutting tool 22 and the drive shaft 34 are configured to be connected in rotation around the longitudinal axis L.

The drive shaft 34 here comprises a tubular lower part 50 provided with an axial recess 52 emerging at the lower end of the drive shaft 34, and the drive part 42 is arranged at the lower end of the drive shaft 34 while being inserted into the axial recess 52.

The drive part 42 and the inner surface of the axial recess 52 bear complementary reliefs allowing them to be connected in rotation around the longitudinal axis L. The drive part 42 and the inner surface of the axial recess 52 here have complementary facets.

The tubular lower part 50 of the drive shaft 34 bears at least one lateral opening 54 to allow the passage of water between the inside of the axial recess 52 and the outside of the drive shaft 34.

The tubular lower part 50 of the drive shaft 34 here comprises several lateral openings 54. The lateral openings 54 are preferably uniformly angularly distributed on the circumference of the drive shaft 34.

The axial recess 52 of the drive shaft 34 is blind. It is closed at its end opposite the lower end of the drive shaft 34, above the lateral opening 54 or lateral openings 54.

The holder 32 comprises a suction chamber 56 traversed by the drive shaft 34, the lateral openings 54 of the drive shaft 34 emerging in the suction chamber 56.

The suction tube 36 is connected to the holder 32 in register with the suction chamber 56, so as to suction the water filled with shavings coming from the suction channel 44 of the cutting tool 22 through the lateral openings 54.

The holder 32 and the drive shaft 34 have at least one rotational guiding assembly 58 comprising a bearing 60 formed on the holder 32 and a complementary transmission shaft 62 formed on the drive shaft 34, for guiding the rotation of the drive shaft 34 relative to the holder 32.

The holder 32 and the drive shaft 34 here have two rotational guiding assemblies 58 located on either side of the suction chamber 56.

Each rotational guiding assembly 58 provides the sealing between the holder 32 and the drive shaft 34. This makes it possible to guarantee effective suction, through the suction tube 36, of the water and shavings coming from the suction channel 44 via the suction chamber 56. The repair device 20 comprises at least one gasket 63, for example an O-ring, positioned between a bearing 60 and the transmission shaft 62 in order to increase the sealing.

The holder 32 is provided with a connector 64 to connect the holder 32 to a manipulator, here a handling pole 24. The connector 64 here has a thread for screwing it to the handling pole 24.

The end 34A of the drive shaft 34, opposite the cutting tool 22, is configured to be connected in rotation to another drive shaft. It is thus possible to rotate the drive shaft 34 of the repair device 20 remotely. The driving is done manually by an operator or using a motor.

Here, the holder 32 is a support tube, the cutting tool 22 being arranged at one end of the support tube, and the drive shaft 34 extending inside the support tube, between the ends of the latter. The holder 32 thus has a shape similar to that of a handling pole 24 used in the pools of nuclear facilities.

The holder 32 has a first tubular end segment 32A, an intermediate tubular segment 32B and a second tubular end segment 32C. The intermediate tubular segment 32B delimits the suction chamber 56. One rotational guiding assembly 58 is located in the first tubular end segment 32A and the other in the second tubular end segment 32C. The suction tube 36 is connected on the intermediate tubular segment 32B.

As illustrated, the first tubular end segment 32, the intermediate tubular segment 32B and the second tubular end segment 32C are separate and assembled end to end in order to form the holder 32.

The first tubular end segment 32A assumes the form of a sleeve fastened to the lower end of the intermediate tubular segment 32B. The first lower tubular segment 32A is for example nested and forcibly fitted at one end of the intermediate tubular segment 32B. In one alternative, the lower tubular segment 32A and the intermediate tubular segment 32B are made in a single piece of material.

As illustrated, the suction tube 36 is formed in a single piece of material with the intermediate tubular segment 32B. The intermediate tubular segment 32B and the suction tube 36 are formed by a three-way tubular junction. In one alternative, the tube 36 is separate from the intermediate tubular segment 32B and assembled on the latter, for example by welding.

The repair device 20 has a stop surface 65 provided to come into contact with the part in which the hole to be re-bored is formed, so as to limit the travel of the cutting tool 22 along the longitudinal axis L of the cutting tool 22. The stop surface 65 here is an annular radial surface surrounding the cutting tool 22 when the latter is mounted on the holder 32.

Here, the repair device 20 has a stop ring 66 mounted at the lower end of the holder 32 and surrounding the cutting tool 22. The stop ring 66 is screwed on a thread provided on the outer surface of the lower end of the holder 32. The stop surface 65 is the lower face of the stop ring 66.

Figure 4:
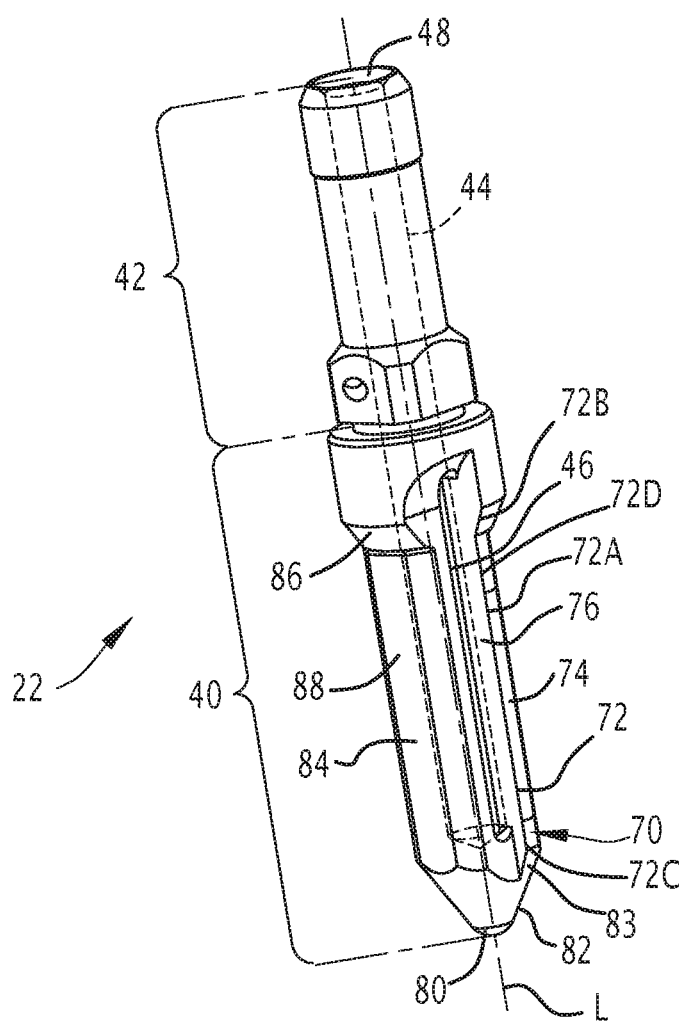
FIG. 4 is a perspective view of a cutting tool of the repair device.

As illustrated in FIG. 4, the cutting tool 22 is a reamer, i.e., a cutting tool suitable for re-boring a pre-existing hole.

The cutting part 40 of the reamer has at least one cutting tooth 70. The cutting part 40 here has exactly one cutting tooth 70. Alternatively, the cutting part 40 has several cutting teeth, preferably distributed uniformly over the circumference of the cutting part 40. If several cutting teeth 70 are provided, preferably the cutting teeth 70 have an identical shape and each cutting tooth 70 is obtained by rotating another cutting tooth 70 around the longitudinal axis L.

The cutting tooth 70 has a cutting edge 72. The cutting edge 72 is located at the junction between a cutting face 74 and an undercut face 76. The cutting face 74 is oriented toward the rear of the cutting edge 72 during the rotation in the cutting direction of the cutting tool 22, while the undercut face 76 is oriented toward the front of the cutting edge 72.

Seen in a radial direction relative to the longitudinal axis L of the cutting tool 22, the cutting edge 72 is rectilinear. In other words, the cutting edge 72 is contained in a radial plane containing the longitudinal axis L of the reamer.

The cutting tool 22 is configured to bore, in a single operation, the centering hole 16, i.e., the circular cylindrical hole 16B and the bevel 16A provided at the inlet of the centering hole 16.

The cutting edge 72 successively has an oblique portion to allow a gradual cutting attack, a rectilinear portion 72C parallel to the longitudinal axis L, an oblique portion 72A moving away from the longitudinal axis L, to bore the circular cylindrical hole 16B, a rectilinear portion 72D parallel to the longitudinal axis L, and an oblique portion 72B moving away from the longitudinal axis L, to machine the bevel 16A provided at the inlet of the centering hole 16.

The cutting part 40 has a diameter increasing gradually from its free end, opposite the drive part 42, toward the drive part 42.

The cutting part 40 successively has, along the longitudinal axis L, from its free end toward the drive part 42, a guiding end 80, a frustoconical guide segment 82, a frustoconical cutting segment 83, a cylindrical segment, a cutting frustoconical segment 84, a cylindrical segment and a cutting frustoconical segment 86.

The guide end 80 preferably has a conical or ogival shape.

The guide end 80 and the frustoconical guide segment 82 make it possible to guide the cutting tool 22 when it is inserted into the centering hole 16 that one wishes to produce. The frustoconical cutting segment 83 allows a gradual cutting attack of the centering hole 16. The frustoconical cutting segment 84 and the frustoconical cutting segment 86 make it possible respectively to machine the cylindrical hole 16B and the bevel 16A.

The cutting edge 72 extends along the cutting frustoconical segment 83, the cylindrical segment arranged after it, the frustoconical cutting segment 84, the cylindrical segment arranged after it and the frustoconical cutting segment 86. More specifically, the oblique portion 72A extends over the frustoconical cutting segment 84 and the oblique portion 72B extends over the frustoconical cutting segment 86. The cutting edge 72 here also extends along part of the frustoconical guide segment 82.

The cutting part 40 has, over its frustoconical cutting segment 84, at least one flat 88. The presence of at least one flat 88 makes it possible to reduce the contact surface between the cutting portion and the inner surface of the hole to be re-machined, and thus to reduce the friction between the cutting tool 22 and the inner surface of the hole to be re-machined.

In one embodiment, the cutting part 40 comprises several flats 88 distributed over the circumference of the frustoconical cutting segment 84. Preferably, the cutting tooth 70 and the flats 88 are distributed uniformly over the circumference of the frustoconical cutting segment 84. The cutting tooth 70 replaces a flat 88.

During machining, the cutting edge 72 penetrates the material and the shavings are formed on the side of the undercut face 76.

The inlet opening 46 of the suction channel 44 is formed along the undercut face 76 of the cutting tooth 70. The inlet opening 46 is preferably located at the base of the undercut face 76. Thus, the material removed by the cutting edge 72 slides along the undercut face 76 and directly penetrates the inlet opening 46 to be suctioned therein.

The inlet opening 46 is elongated along the longitudinal axis L. It preferably extends substantially over the entire length of the cutting tooth 70. This makes it possible to recover shavings formed in any location along the cutting tooth 70.

The suction channel 44 extends axially inside the cutting tool 22, from the inlet opening 46 to the outlet opening 48.

The outlet opening 48 here is located at the axial end of the drive part 42 opposite the cutting part 40. The outlet opening 48 emerges axially.

In one embodiment, the cutting tool 22 is for example made from a grade of low carbon stainless steel that is very hard and wear-resistant, for example ASTM 440A and B steel according to standard ASTM A276 or a X90CrMoV18 steel or steel known under the commercial name M340 ISOPLAST®.

A method for repairing a centering hole 16 of an upper nozzle 12 carried out using the repair device 20 is described below, in reference to FIGS. 1 to 4.

The nuclear fuel assembly 2 having a damaged centering hole 16 is taken out of the core of the nuclear reactor and placed in a pool 4 of the nuclear power plant. Preferably, it is arranged in a cell, for example a storage cell, a transfer cell or a chute cell.

During all of these operations, the nuclear fuel assembly 2 remains underwater. Once the nuclear fuel assembly 2 is suitably arranged in the pool 4, the upper nozzle 12 of the nuclear fuel assembly 2 is located several meters below the free surface of the water, typically 3 to 5 meters.

The holder 32 of the repair device 20 is provided with a calibrated cutting tool 22, for example a reamer, the shape and dimensions of which, and in particular those of the cutting tooth 70, are adapted to those of the damaged centering hole 16, and the stop ring 66 is adjusted so as to machine the cylindrical hole 16B and the bevel 16A located at the inlet of the centering hole 16 without exceeding the maximum design dimensions of the centering hole 16.

The holder 32 of the repair device 20 is suspended from a lifting tool and the drive shaft 34 of the repair device 20 is connected to another drive shaft rising to the free surface of the pool 4. The lifting tool is for example a tubular handling pole 24, the other drive shaft extending inside the handling pole 24.

The outlet of the suction tube 36 is fluidly connected to the suction pipe 28, which is fluidly connected to the suction and filtration device 30.

The repair device 20 is lowered into the pool 4 until initiating the insertion of the cutting tool 22 into the damaged centering hole 16.

The suction and filtration device 30 is activated so as to suction fluid through the suction channel 44 of the cutting tool 22 and the suction pipe 28, filter the suctioned fluid and discharge the filtrate into the pool 4.

The cutting tool 22 is rotated, manually or using a motor, via the drive shaft 34, then the holder 32 is gradually lowered to re-bore the damaged centering hole 16 and machine the bevel 16A until the stop surface 65 is in contact with the upper nozzle 12 in which the centering hole 16 is arranged.

During the machining, the shavings generated by the cutting tool 22 are raised by the undercut face 76 and the cutting edge 72, and suctioned with water by the suction and filtration device 30, successively through the inlet opening 46 of the suction channel 44, this suction channel 44, the outlet opening 48 of the suction channel 44, the axial recess 52 of the drive shaft 34, the lateral openings 54 of the drive shaft 34, the suction tube 36 and the suction pipe 28. The suctioned shavings are retained by the suction and filtration device 30. The water from the pool 4 suctioned with the shavings is discharged into the pool 4 at the outlet of the suction and filtration device 30. The recovered shavings, which are radioactive, are next treated like radioactive waste.

A centering hole 16 of an upper nozzle 12 of the nuclear fuel assembly 2 must be manufactured with strict machining allowances, to guarantee precise positioning of the nuclear fuel assembly 2 in the core of the nuclear reactor.

During the remachining of the cylindrical hole 16B and the bevel 16A, the dimensions of the cylindrical hole 16B and the bevel 16A can be increased. Nevertheless, the stop ring 66 is adjusted and the cutting tool 22 is chosen so as not to exceed the maximum envelope of the centering hole 16.

Figure 5:
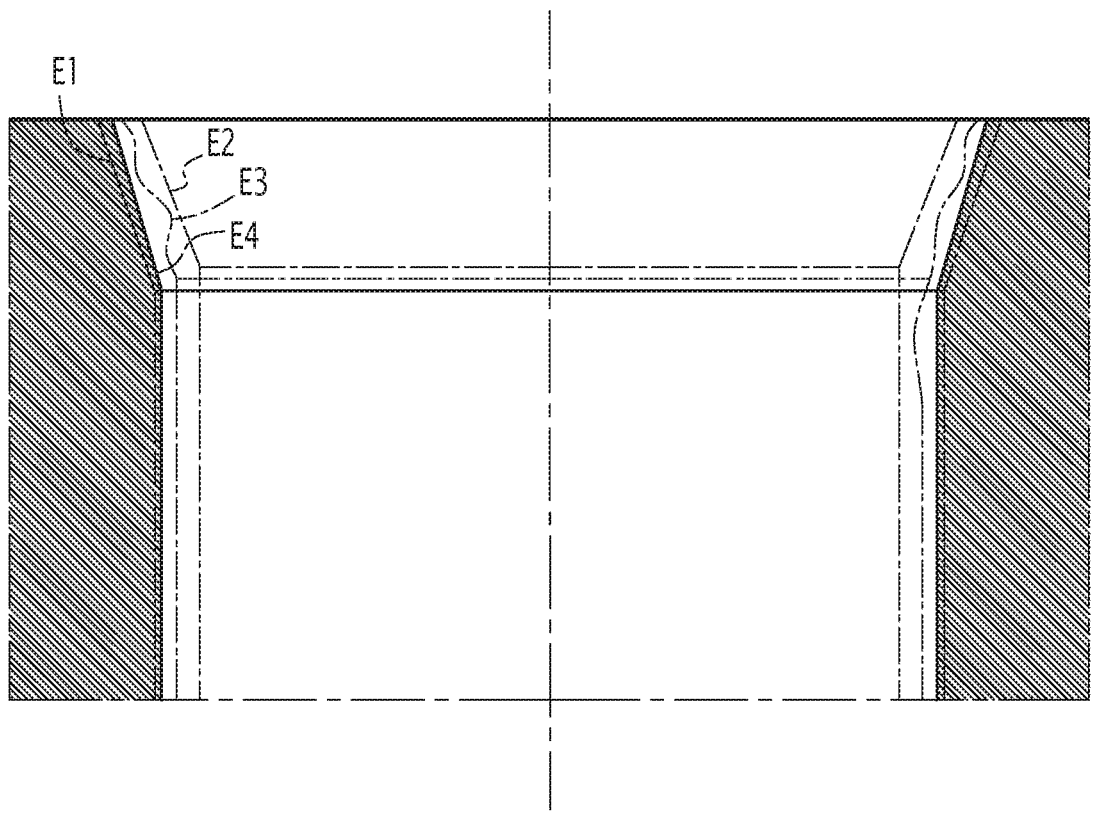
FIG. 5 is a schematic view illustrating the profile of a damaged centering hole, before and after repair.

In FIG. 5, a first fictitious envelope E1 and a second fictitious envelope E2 represent the envelopes of the cylindrical hole 16B and the bevel 16A respectively with the maximum dimensions and the minimum design dimensions.

A third envelope E3 represents the envelope of the damaged centering hole 16. Before damage, the third envelope E3 is located between the first envelope E1 and the second envelope E2. Given the machining allowances, the third envelope E3 is generally not combined with the first envelope E1 or the second envelope E2.

A fourth envelope E4 represents the envelope of the centering hole 16 remachined using the repair device 20. The fourth envelope E4 is located between the first envelope E1 and the third envelope E3. The cylindrical hole 16B and the remachined bevel 16A have dimensions larger than those of the initial centering hole 16. Thus, the fourth envelope E4 corresponds to dimensions larger than those of the third envelope E3.

The stop ring 66 is adjusted and the cutting tool 22 used for the remachining is calibrated and chosen so as not to exceed the maximum dimensions of the first envelope E1. Thus, the fourth envelope E4 corresponds to dimensions smaller than the first envelope E1.

In one particular embodiment, the cutting tool 22 is chosen to obtain, at the end of the machining, a cylindrical hole 16B and a bevel 16A corresponding exactly to the maximum design dimensions. This makes it possible to guarantee cementing of the material projections due to the damage of the centering hole 16.

The invention is not limited to the illustrated embodiment.

The repair device can be used for the underwater repair of other damaged holes in a nuclear power plant. In particular, the repair device is usable to repair a mistake-proofing hole of an upper core nozzle or a centering hole of a nuclear fuel assembly lower nozzle, or a core plate, for example a water distribution hole of a lower or upper core plate.

The reamer can be replaced by another cutting tool, for example a machining cutter. A conical machining cutter can for example be used to remachine a damaged frustoconical bevel, without remachining a circular cylindrical hole extending from the bevel, if the cylindrical hole itself is not damaged. A traditional circular machining cutter can for example be used to remachine a circular cylindrical hole, without remachining the bevel, if the bevel hole itself is not damaged or if the damaged hole does not have an inlet bevel. A shaping machining cutter can be used to remachine both the bevel and the circular cylindrical hole.

In general, the repair device is provided for a cutting tool comprising a suction channel between an inlet opening located in a cutting part and an outlet opening provided on a driving part of the cutting tool. The inlet opening is preferably similar to that of the reamer of FIG. 4. It extends at the base of a cutting face of a cutting tooth, while preferably being elongate and extending over substantially the entire length of the cutting tooth.

A cutting tool may comprise one or several teeth, each tooth extending rectilinearly along the longitudinal axis of the cutting tool, obliquely relative to the cutting tool or helically around the cutting tool.

Owing to the repair device and method, the repair of a hole of a nuclear reactor part by remachining underwater is done quickly. The remachining is easy, and generally easier and faster than replacing the part.

Furthermore, repairing the part makes it possible to extend the lifetime of the part. It avoids having to store and treat the removed part, which is highly radioactive.

The repair device makes it possible to perform precise machining reliably, which makes it possible to remain below maximum design dimensions. Of course, if it is not possible to remachine the hole because the hole has already reached the maximum dimensions, the part should be replaced, or it is acceptable to justify exceeding the maximum design dimensions.

The repair device is simple and easy to use, decontaminate and transport from one nuclear site to another, based on the operations to be performed. It can be used by an operator with quick training.

Remachining a centering hole is faster than replacing a nuclear fuel assembly upper nozzle. The risk of damaging other parts of the nuclear fuel assembly is low.

A fuel assembly generally being provided with a cluster, unlike replacing an upper nozzle, remachining a centering hole does not require removing the cluster and storing it temporarily.

The calibrated reamer and the adjustment of the stop ring make it possible to ensure that the machined hole remains within the predefined maximum dimensions for the hole. It is therefore not necessary to perform a dimensional inspection of the damaged hole at the end of the re-boring. A visual appearance inspection suffices, to verify that the pushed in material has indeed been removed.

Compliance with the maximum design dimensions makes it possible to ensure that the repaired upper nozzle remains compatible with the elements of the nuclear facility called upon to cooperate with this centering hole, like the centering pins of the upper core plate, the handling equipment for the nuclear fuel assemblies and the operating equipment on the nuclear fuel assemblies.

Furthermore, the repair device has a small bulk, in particular in its lower part bearing the cutting tool, such that the risk of damaging the springs of an upper nozzle or a cluster received in the nuclear fuel assembly is low. The holder assuming the form of a tube similar to a standard handling pole is particularly compact and suitable for accessing the centering hole without risk of interference with the surrounding elements.

The invention claimed is:

1. A repair device for the underwater repair of a hole of a nuclear reactor part by remachining the hole, the repair device comprising:
    a holder;
    a cutting tool held by the holder and having at least one cutting tooth for remachining an inner surface of the hole, the cutting tool having a suction channel extending into the cutting tool between at least one inlet opening and at least one outlet opening;
    a drive shaft for rotating the cutting tool, the drive shaft being held by the holder; and
    a suction tube connected to the holder and fluidly connected to the outlet opening of the suction channel,
    wherein the cutting tool comprises a cutting part and a drive part connected to the drive shaft, the outlet opening emerging in a recess of the drive shaft, the drive shaft having at least one lateral opening for the passage of the fluid from the inside of the recess toward the outside, the suction channel being connected to the holder in register with the lateral opening to suction the fluid through the lateral opening.

2. A repair device for the underwater repair of a hole of a nuclear reactor part by remachining the hole, the repair device comprising:
    a holder;

a cutting tool held by the holder and having at least one cutting tooth for remachining an inner surface of the hole, the cutting tool having a suction channel extending into the cutting tool between at least one inlet opening and at least one outlet opening;

a drive shaft for rotating the cutting tool, the drive shaft being held by the holder; and a suction tube connected to the holder and fluidly connected to the outlet opening of the suction channel, wherein the cutting tooth comprises a portion for machining a circular cylindrical hole and a portion for machining a frustoconical bevel at the inlet of the circular cylindrical hole.

3. A repair device for the underwater repair of a hole of a nuclear reactor part by remachining the hole, the repair device comprising:

a holder;

a cutting tool held by the holder and having at least one cutting tooth for remachining an inner surface of the hole, the cutting tool having a suction channel extending into the cutting tool between at least one inlet opening and at least one outlet opening;

a drive shaft for rotating the cutting tool, the drive shaft being held by the holder; and a suction tube connected to the holder and fluidly connected to the outlet opening of the suction channel, further comprising a stop surface configured to abut against the part in which the hole to be repaired is arranged in order to limit the travel of the cutting tool in the hole to be repaired.

4. The repair device according to claim 3, wherein the suction channel extending extends inside the cutting tool.

5. The repair device according to claim 3, wherein the cutting tool comprises a cutting part and a drive part connected to the drive shaft, the outlet opening emerging in a recess of the drive shaft, the drive shaft having at least one lateral opening for the passage of the fluid from the inside of the recess toward the outside, the suction channel being connected to the holder in register with the lateral opening to suction the fluid through the lateral opening.

6. The repair device according to claim 3, wherein the holder and the drive shaft comprise at least one rotational guiding assembly comprising a bearing provided on the holder and a complementary transmission shaft provided on the drive shaft.

7. The repair device according to claim 6, wherein the cutting tool comprises a cutting part and a drive part connected to the drive shaft, the outlet opening emerging in a recess of the drive shaft, the drive shaft having at least one lateral opening for the passage of the fluid from the inside of the recess toward the outside, the suction channel being connected to the holder in register with the lateral opening to suction the fluid through the lateral opening and wherein the holder and the drive shaft comprise two rotational guiding assemblies located, along the drive shaft, on either side of the or each lateral opening.

8. The repair device according to claim 6, wherein at least one rotational guiding assembly provides the sealing between the holder and the drive shaft.

9. The repair device according to claim 3, wherein the holder is a support tube, the cutting tool being arranged at one end of the holder, the drive shaft extending inside the holder between the ends of the holder.

10. The repair device according to claim 3, wherein the cutting tool extends along a longitudinal axis, the cutting tooth extending substantially rectilinearly along the longitudinal axis.

11. The repair device according to claim 3, wherein the inlet opening of the suction channel is arranged at a base of an undercut face of the cutting tooth.

12. The repair device according to claim 3, wherein the inlet opening of the suction channel is elongated along the cutting tooth.

13. The repair device according to claim 3, wherein the cutting tool is a reamer.

14. The repair device according to claim 3, wherein the cutting tooth comprises a portion for machining a circular cylindrical hole and a portion for machining a frustoconical bevel at the inlet of the circular cylindrical hole.

15. The repair device according to claim 3, wherein the cutting tool comprises, on a cutting part of the cutting tool bearing the cutting tooth, at least one flat offset on the circumference of the cutting part, relative to the cutting tooth.

16. The repair device according to claim 3, wherein the cutting tool is configured to produce a centering hole for a nuclear fuel assembly upper nozzle, a mistake-proofing hole for a nuclear fuel assembly upper nozzle, a centering hole for a nuclear fuel assembly lower nozzle, a hole for a lower core plate or a hole for an upper core plate.

* * * * *